(12) United States Patent
Heim

(10) Patent No.: US 7,059,983 B2
(45) Date of Patent: Jun. 13, 2006

(54) MULTIPLE SPROCKET, MULTIPLE FUNCTION CHAIN GUIDE

(76) Inventor: Jon Heim, 61 Clarendon Rd., Pacifica, CA (US) 94044

( * ) Notice: Subject to any disclaimer, the term of this patent is extended or adjusted under 35 U.S.C. 154(b) by 76 days.

(21) Appl. No.: 10/394,115

(22) Filed: Mar. 20, 2003

(65) Prior Publication Data

US 2004/0009835 A1    Jan. 15, 2004

Related U.S. Application Data

(60) Provisional application No. 60/367,448, filed on Mar. 20, 2002.

(51) Int. Cl.
*F16H 7/12* (2006.01)
*F16H 7/20* (2006.01)
*F16H 57/12* (2006.01)

(52) U.S. Cl. .............................. 474/80; 474/82; 474/78

(58) Field of Classification Search ............ 474/78–83, 474/133–138, 113–117, 101, 144, 190, 191; 280/234, 236
See application file for complete search history.

(56) References Cited

U.S. PATENT DOCUMENTS

| | | | | |
|---|---|---|---|---|
| 51,012 A | * | 11/1865 | Buchanan | ............... 474/83 |
| 1,181,175 A | | 5/1916 | Shapiro | |
| 1,535,114 A | | 4/1925 | Edmunds | |
| 2,204,084 A | | 6/1940 | Hughes | |
| 2,801,547 A | * | 8/1957 | Guibert | ............... 474/83 |
| 3,398,973 A | | 8/1968 | Shimano | |
| 3,402,942 A | | 9/1968 | Shimano | |
| 3,416,385 A | | 12/1968 | Schenk | |
| 3,731,550 A | * | 5/1973 | Malecki et al. | ............... 474/83 |
| 3,785,219 A | | 1/1974 | Anthamatten | |
| 4,023,424 A | * | 5/1977 | Ryan et al. | ............... 474/80 |
| 4,090,737 A | | 5/1978 | Jensen | |
| 4,141,245 A | | 2/1979 | Brandstetter | |
| 4,240,303 A | | 12/1980 | Mosley | |
| 4,261,214 A | | 4/1981 | Watanabe | |
| 4,479,660 A | | 10/1984 | Pattison | |
| 4,758,205 A | * | 7/1988 | Durham | ............... 474/80 |
| 4,832,667 A | | 5/1989 | Wren | |
| 4,842,569 A | * | 6/1989 | Orr | ............... 474/83 |
| 4,960,402 A | | 10/1990 | Klein | |
| 5,213,549 A | * | 5/1993 | Blanchard | ............... 474/82 |
| 5,221,236 A | | 6/1993 | Raymer | |
| 5,243,830 A | * | 9/1993 | Ito et al. | ............... 62/344 |
| 5,460,576 A | | 10/1995 | Barnett | |
| 5,613,918 A | | 3/1997 | Fleischman | |
| 5,618,240 A | * | 4/1997 | Gilbert | ............... 474/50 |

(Continued)

FOREIGN PATENT DOCUMENTS

DE         3232251 A1 *  3/1984   ................. 280/234

(Continued)

*Primary Examiner*—Marcus Charles
(74) *Attorney, Agent, or Firm*—Frank P. Becking

(57) ABSTRACT

Chain guides for the front sprockets of bicycles are disclosed. More particularly, the chain guides are adapted or configured for bicycles that have multiple (usually 2 or 3) sprockets/chain rings mounted to the crank assembly. The setup is provided to freely allow shifting between the gears. All of the chain guide variations presented are provided with an outer flange attached to a roller section so that these portions roll together with the chain they restrain. Additional optional features include aspects to do with roller positioning, bracket mounting, roller configuration and supplemental chain restrain means (including a stop/post member and inner roller flange.)

15 Claims, 5 Drawing Sheets

U.S. PATENT DOCUMENTS

| | | | | |
|---|---|---|---|---|
| 5,725,450 A | * | 3/1998 | Huskey | 474/116 |
| 6,117,034 A | * | 9/2000 | Vine | 474/134 |
| 6,165,092 A | | 12/2000 | Bramham | |
| 6,190,275 B1 | * | 2/2001 | Ciancio et al. | 474/144 |
| 6,648,783 B1 | * | 11/2003 | Bogner | 474/134 |
| 6,743,131 B1 | * | 6/2004 | Walker | 474/134 |

FOREIGN PATENT DOCUMENTS

| | | | | |
|---|---|---|---|---|
| DK | 51214 | * | 2/1936 | 474/80 |
| IT | 418098 | * | 2/1947 | 474/80 |
| IT | 453294 | * | 11/1949 | 474/80 |
| IT | 472634 | * | 10/1952 | 474/80 |
| JP | 04-154496 A | * | 5/1992 | 474/78 |

* cited by examiner

MULTIPLE SPROCKET, MULTIPLE FUNCTION CHAIN GUIDE

CROSS-REFERENCE TO RELATED APPLICATIONS

This filing claims the benefit of U.S. Provisional Patent Application Ser. No. 60/367,448 filed Mar. 20, 2002 and entitled, "Chain Guide for Multiple Sprocket Bicycles," which is incorporated by reference herein in its entirety.

FIELD OF THE INVENTION

This invention relates to chain guides for the front sprockets of bicycles. More particularly, it is adapted or configured for bicycles that have multiple (usually 2 or 3) sprockets/chain rings mounted to the crank assembly.

BACKGROUND OF THE INVENTION

Off-road bicycles (i.e., mountain bikes) are subjected to bumpy terrain that cause the chain to bounce around and sometimes derail from the front sprocket. Most off road bicycles have 3 front sprockets, (i.e., small, medium, and large sprockets), to provide a wide gear range to allow pedaling uphill and downhill. Three front sprockets, however, make it difficult to provide chain retention for rough conditions while still allowing shifting. For downhill racing, off-road bikes typically have just one front sprocket since they typically do not need to ride uphill. Downhill bikes are subjected to even more extreme conditions, which make the likelihood of chain derailment even greater.

With a single sprocket, chain retention is sometimes accomplished with circular plates on each side of the sprocket, and shallow-grooved pulleys or rollers at the chain entrance and exit (U.S. Pat. No. 5,725,450 to Huskey). The plates provide axial retention, and the pulleys provide chain retention in the radial direction. The chain is trapped on all sides. The circular plates also provide protection for the sprocket from impact damage. Another chain retention method involves deeply grooved pulleys at the chain entrance and exit from the sprocket. With this approach the chain is trapped by the flanges and grooves of the pulleys.

Both of these methods, however, do not allow the use of multiple front sprockets and/or shifting. The present invention allows the use of multiple front sprockets and/or shifting while providing positive chain retention at the chain exit from the sprocket. This invention is preferably used with a standard front derailleur, which shifts the chain on the front sprockets.

SUMMARY OF THE INVENTION

The present invention comprises a pulley with a single large outer flange of about 1.5 to about 3 inches in diameter, and a straight cylindrical and/or tapered roller section of about 0.5 to about 1.5 inches long by about 1.0 to about 1.5 inches in diameter. The pulley rotates about a central axis on bearings or directly about the pulley material. The pulley is mounted to a mounting plate with a bolt that passes through the central bearing axis and a slot in the mounting plate. The mounting plate is then fastened to the bicycle frame by inserting a crank spindle bearing cup through a hole in the mounting plate and threading the cup into the frame bottom bracket. The mounting plate is then clamped between the bearing cup and frame.

The mounting plate may also be fastened directly to the bicycle frame with dedicated fasteners and mounting tabs. The mounting plate may also have provisions for mounting and/or integrating the front derailleur with the plate.

The outer flange is designed to preferably overlap the outer front sprocket to constrain the chain in the axial direction on the outside, and the straight or tapered roller section constrains the chain in the radial direction, also helping to keep the chain on the sprocket. The long length of the roller section allows the chain to slide across the pulley during shifting from the smaller inner and middle sprockets to the large outer sprocket. Especially where no separate inner flange is provided, the mounting bracket itself preferably provides a stationary flange preventing the chain from derailing towards the inside.

One variation of the invention includes only one pulley flange. Another variation provides for a double-flanged pulley. Each variation of the invention may employ an offset mounting plate, so the chain does not rub the mounting plate. The pulley in the double-flanged variation of the invention may have the same wide straight cylindrical or tapered roller section as in the one-flange embodiment—which is wide enough to cover the chain position in all three front sprockets. Alternately, (in either embodiment), the roller section may be configured for only two front sprockets. In such instances the pulley body will be about 0.5 to about 0.75 inches long, but otherwise similar to the embodiments pictured.

The mounting plate should to be thin so when mounted between the crank spindle bearing cup and bicycle frame it does not offset the crank position excessively which could degrade shifting performance. The plate should also be stiff/strong so it does not deflect or yield under operating stresses. Materials that may be used for construction include, but are not limited to, heat treated steel, stainless steel, aluminum alloy, carbon fiber, titanium and alloys thereof.

The pulley should to be quiet and shock resistant, yet strong and wear resistant. Suitable materials that may be used for pulley construction include, but are not limited to, rubber, urethane, polyurethane, and thermoplastics such as delrin, teflon, and nylon.

Because this invention is for a bicycle, its weight should be kept to a minimum. Still, strength and durability and corrosion resistance are important due to the nature of off-road cycling. The assembly will be subjected to shock, vibration, wear, and corrosion. Preferred materials and sub-components are selected accordingly. To optimize the shape of the mounting bracket, known analytical techniques, such as finite element analysis may be employed. This method puts the appropriate amount of material only where it is needed to counteract the stresses, and thereby minimize overall mass.

The bracket preferably includes a slot to mount the pulley. This adjustment feature allows for use of different sized outer sprockets. The mounting bracket will typically be about 4.0 to about 7.0 inches long. The bracket may also have a bend or stiffening rib to increase side-to-side stiffness, while still allowing a thin mounting section.

In some conditions, the chain can stick to the underside of the small or middle sprockets and wrap around and cause the chain to jam. To address this, in the present invention a pin or post may be fastened to the mounting plate between the pulley and crank spindle. Such a post is so-positioned to provide a barrier between the chain and sprocket and prevent the chain from sticking to the small or middle sprockets. The post may also be mounted on and rotate freely on bearing(s).

The pulley may have a straight or tapered central roller section where the chain contacts it. It may also have a stepped-down or step-tapered section with one or more straight sections of different diameters, with a tapered section between each straight section. It may also have one or more circumferential grooves. These tapered and grooved features help keep the chain on during backpedaling.

The pulley roller section may also be made in two parts, a hollow outer piece that presses onto a cylindrical portion of an inner mating piece. The mounting plate may be configured with a larger flange section, concentric with the crank spindle hole, which overlaps the small front sprocket to prevent the chain from dropping off the sprocket towards the inside.

While any of the features or advantages described in connection with the present invention may be provided, it may be the case that only some are employed. Whatever the case, the present invention includes systems comprising any of the features described herein (and/or "consisting" of any such features). Stated otherwise, it is specifically contemplated that any optional feature of the inventive embodiments/variations described herein may be set forth and claimed independently, or in combination with any one or more of the features described herein. Further, methodology described in association with the devices disclosed also forms part of the invention. The invention also comprises such hardware (e.g., built-up bicycles) and methodology as may be used in connection with that described which is incorporated by reference.

BRIEF DESCRIPTION OF THE DRAWINGS

Each of the figures diagrammatically illustrates aspects of the invention. To facilitate understanding, the same reference numerals have been used (where practical) to designate similar elements that are common to the figures. Some such numbers have, however, been omitted.

DETAILED DESCRIPTION

It is to be understood that this invention is not limited to particular variations set forth and may, of course, vary. Various changes may be made to the invention described and equivalents may be substituted without departing from the true spirit and scope of the invention. Many modifications may be made to adapt a particular situation, material, composition of matter, process, process step or steps, to the objective, spirit and scope of the present invention. All such modifications are intended to be within the scope of the claims made herein. Furthermore, where a range of values is provided, it is understood that every intervening value between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in practicing present invention, the preferred methods and materials are described. All existing subject matter mentioned herein (e.g., publications, patents, patent applications and hardware) is incorporated by reference herein in its entirety. The referenced items are provided solely for their disclosure prior to the filing date of the present application. Nothing herein is to be construed as an admission that the present invention is not entitled to antedate such material by virtue of prior invention.

Finally, it is noted that as used herein and in the claims to be made that the singular forms "a," "and," "said" and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely," "only" and the like in connection with the recitation of claim elements or the use of a "negative" claim limitation(s).

Figure 1A:
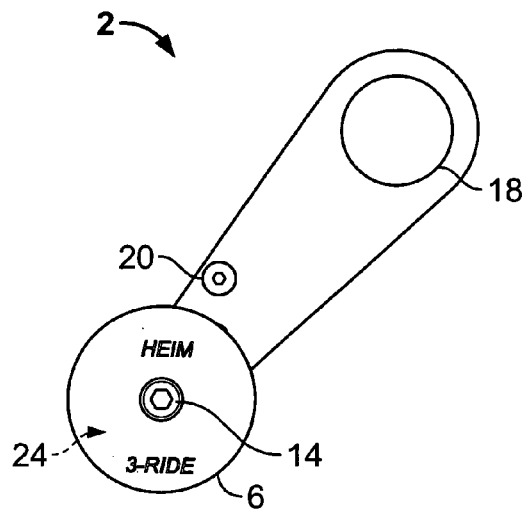
FIGS. 1A–1C are front, rear and end views of a chain guide variation according to the present invention.
Figure 1B:
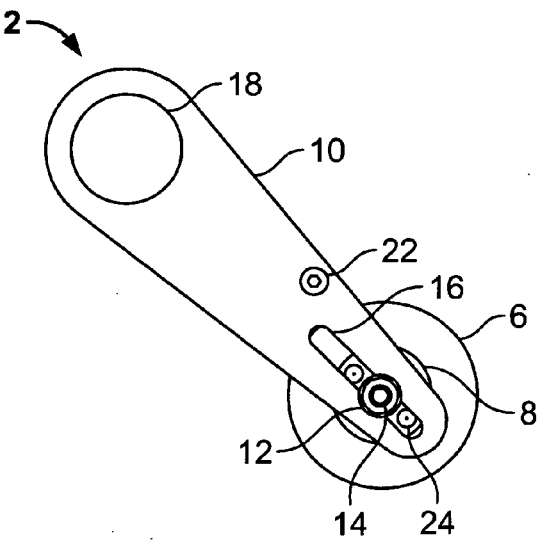
Figure 1C:
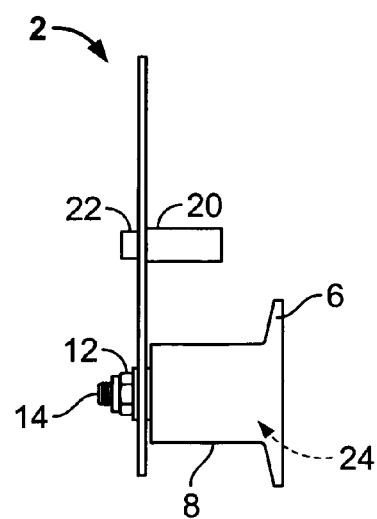

Turning now to FIGS. 1A–1C, one variation of the invention is disclosed. Chain guide 2 includes/comprises a pulley 4 incorporating an outer flange 6 and a roller section 8. These elements are preferably sized as referenced above.

The pulley is rotably/rotatably attached to a mounting plate. A nut 12 and bolt 14 interface may be utilized or some other manner of connection. Various spacers may be provided for adjustment of the pulley along its rotational axis. As noted above, the pulley may rotate about a central axis on bearings or directly about the pulley material. The optional bearings 24 may be needle bearings as shown, cartridge bearings or of any other suitable variety.

As shown, the pulley is configured to be adjustable along a slot 16 in the mounting plate. However, a basic single-point connection is also contemplated. Mounting plate 10 also includes a frame mounting hole 18 as discussed further below.

FIGS. 1A–1C also show a pin or post 20, secured to mounting plate 10 by another bolt 22. As noted above, such an element helps avoid the chain of a bicycle from sticking to its smaller sprocket(s). Whether depicted as shown or not, the post may be secured to the mounting plate while allowing rotational freedom. Bearings may be provided in such case. Otherwise, the post may be synched-down, as in a stationary attachment.

Figure 2A:
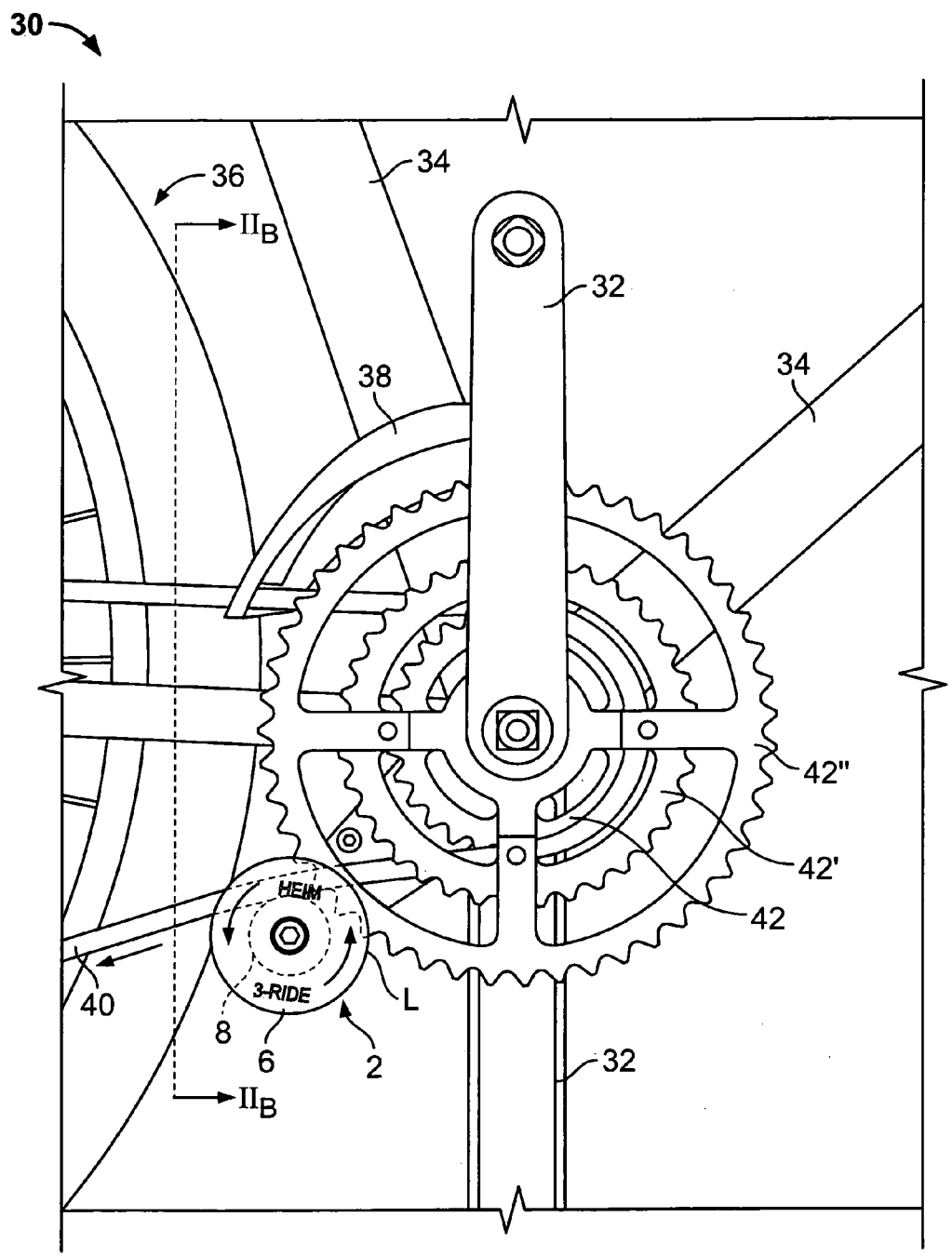
FIG. 2A is a side view of the chain guide in FIGS. 1A–1C installed on a bicycle.

FIG. 2A depicts a preferred relationship between the inventive chain guide 2 and a bicycle 30. The section of the bicycle 30 shown includes cranks 32, frame tubing 34, a rear wheel 36, front derailleur 38, a chain 40 and three sprockets 42, 42' and 42". The chain is shown riding on the smallest sprocket 42. Of course, as stated above, the invention may also find particular use in two-sprocket bike setups as well.

In any case, a preferred manner of positioning the chain guide is shown. Its flange 6 preferably at least partially overlaps outermost sprocket 42" slightly (but to outside), thereby providing a barrier so that the chain cannot skip outward off of the sprockets. Roller portion 8 is set back from the sprocket teeth as to avoid interference or rubbing with them (as indicated by broken line). The mounting bracket is configured to allow for such placement. Additional optional considerations for design of the mounting bracket have also been noted above.

As to the interaction between the guide and the chain, pulley roller 8 is shown positioned to contact chain 40 while engaged with sprocket 42. As the chain is shifted by derailleur 38 to the larger gears, chain guide 2 remains stationary, further tensioning the chain. Note, however, that a slight amount of clearance (approximately 0.40"/1 mm) is preferably provided between the chain when on sprocket 42" and the roller to avoid any pinching effects or unnecessary friction therebetween.

Another aspect of the invention to note is the manner in which the connected/integrated flange and roller offers improvement over a system where such elements are independent or an outer member confining the chain is stationary. Particularly, since the entire pulley (roller and flange(s)) rolls with the chain as depicted by the arrows in FIG. 2A (rather than scraping past it), the system is quieter. In addition wear is reduced. Still further, the upward action at the leading side of the flange at point "L" works to kick the chain back toward a seated position if dislodged.

Figure 2B:
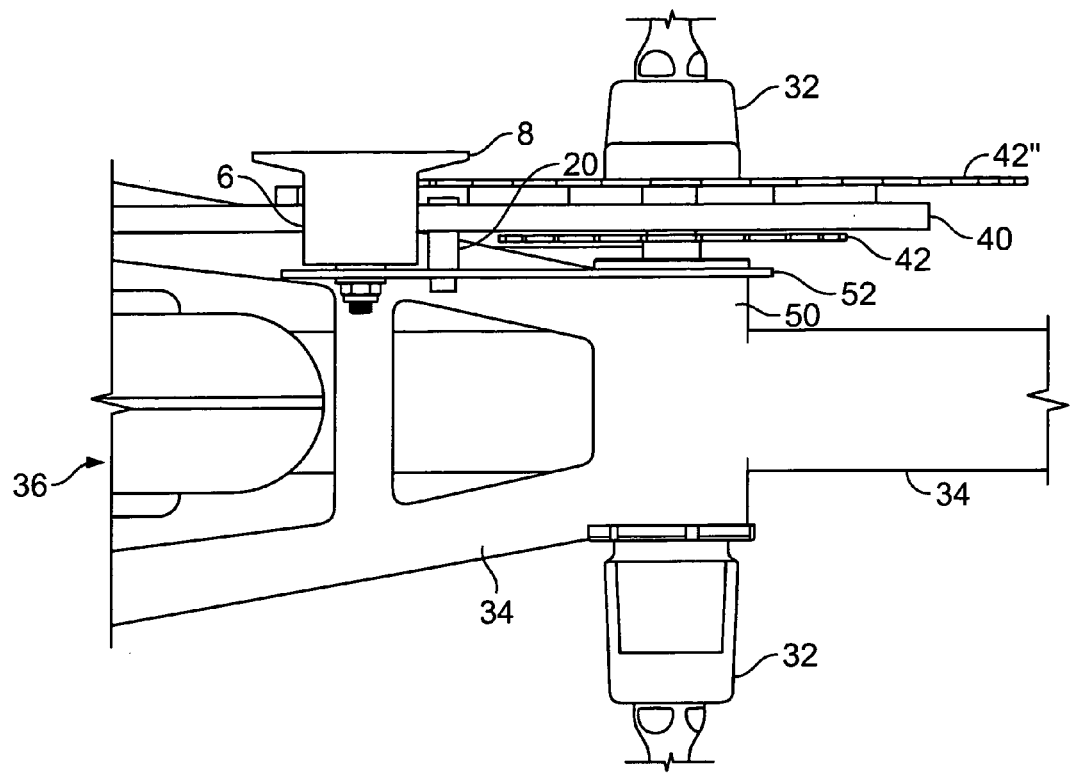
FIG. 2B shows the same from below, in the direction of line $II_B$—$II_B$ in FIG. 2A.

With respect to the affixation of mounting bracket 10 to the bicycle frame, FIG. 2B is most instructive. Particularly, this figure shows the manner in which hole 18 in the mounting plate may be affixed to the bicycle frame's bottom bracket shell 50 by a spindle bearing cup 52 that is inserted in a cup (not shown) threaded into the frame bottom bracket. Of course, other mounting options as noted above are also possible. Still, FIG. 2B shows a preferred mode of mounting the chain guide.

FIG. 2B also shows the relative spacing of elements. The figure offers a view of the interaction of chain 40, pin 20, sprockets 42–42" and chain guide 2. As opposed to what is shown in FIG. 2A, in FIG. 2B chain 40 is shown moved-over to the second sprocket 42'. As evident, it is able to do so by traversing some of the width of roller 8 as intended. Note that the flange is preferably positioned so as to touch/contact the chain when in the outermost ring 42" in order to provided maximum retention properties.

The other chain guides pictured in the figures are generally intended to operate in such a manner as well. However, these alternate chain guides—2' (FIGS. 3A and 3B), 2" (FIGS. 4A and 4B), 2''' (FIG. 5) and 2'''' (FIGS. 6A and 6B)—offer additional or alternate features.

Figure 3A:
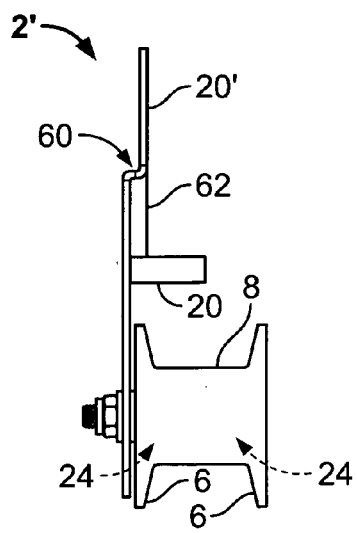
FIGS. 3A and 3B are end and side views of another chain guide variation of the invention.
Figure 3B:
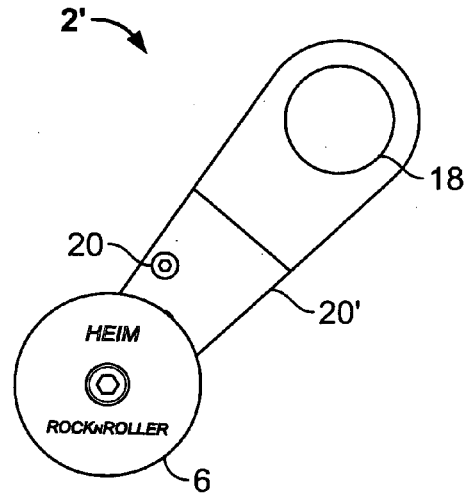

Chain guide 2" in FIGS. 3A and 3B is a double-flange embodiment. Each flange 6 offers such advantages as noted above. Providing an inner flange in addition to an outer flange as discussed above in connection with the first variation of the invention offers the additional potential advantage in replacing the inner confinement role of the mounting plate with a rotating member. Mounting plate 20' includes an offset 60. As noted above, such a feature can provide more space and improved mounting so, for example, that the chain does not rub the mounting plate.

Mounting plate 20' is also shown to include a rib, flange or wall 62. Preferably, it is produced by integrally with the mounting plate material by bending our initial molding (e.g., where a composite material is used). Such feature(s) significantly strengthen/stiffen the structure in a lateral direction.

Figure 4A:
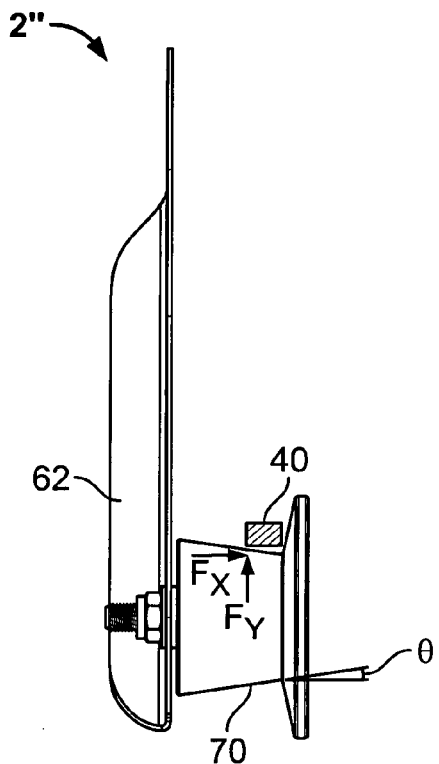
FIGS. 4A and 4B are end and oblique views of still another chain guide variation of the invention.
Figure 4B:
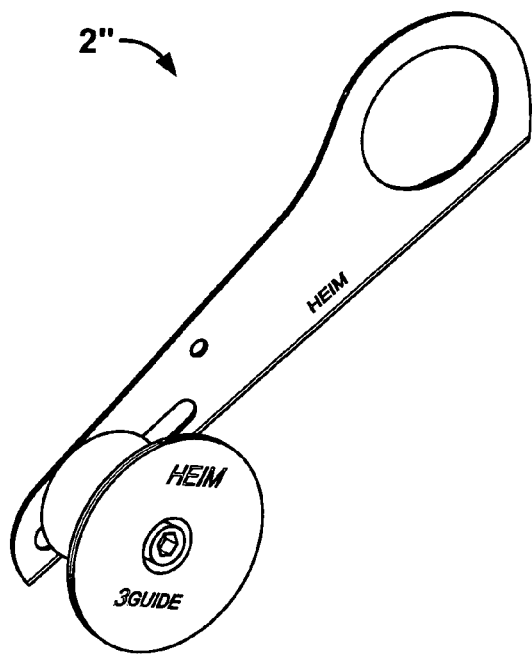

Likewise, as shown in FIGS. 4A and 4B, mounting plate 20" of the chain guide 2" includes such a supplemental structure 62'. Mainly, what differs further about this device is that the roller section 70 is tapered. The value of doing so is illustrated in connection with a section of chain 40. The taper on the roller provides for components of force $F_x$ and $F_y$ in reaction to contact thereto by the chain. Such interaction helps keep the chain on the sprockets. The angle of θ of the taper may vary (indeed, it may be compound). Generally, the angle will be between about 3.5° and about 7.5°, most advantageously about 5° (the included angle being 2 times θ in each case). These values are tuned specifically to achieve optimal results in "cross-chaning" (i.e., to account for chain paths not parallel to planes defined by the sprockets due to gear selection).

Figure 5:
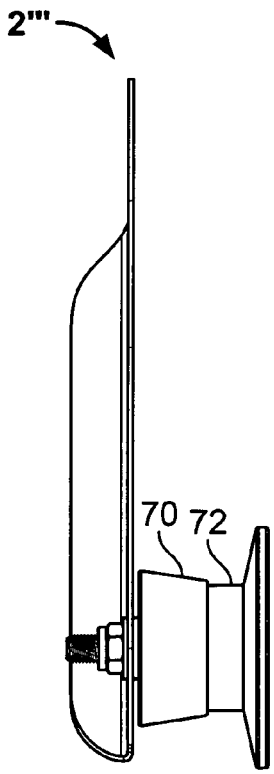
FIG. 5 is an end view of a grooved variation of the invention.

FIG. 5 shows a variation of the inventive chain guide 2''' in which a tapered roller section 70 is provided with the addition of an inset or grooved portion 72. This combination of features helps lock-in the chain into groove 72 when the chain is in the largest forward gear. The taper-groove combination in FIG. 5 represents the most specific example of a stepped-down approach between portions of the roller section. A plurality of flat or straight steps (grooves at different levels—smaller closer to the smaller sprocket(s) is also contemplated.

Figure 6A:
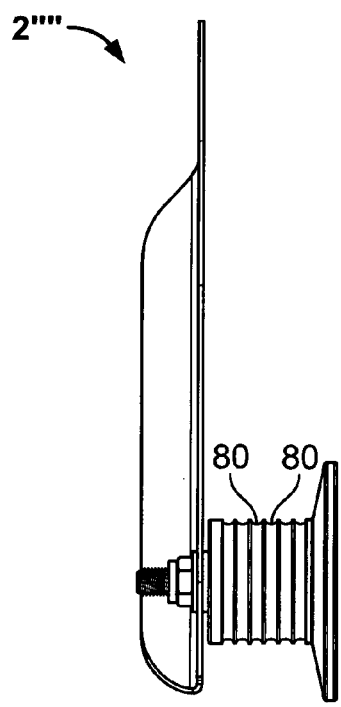
FIGS. 6A and 6B are end and perspective views of another grooved variation of the invention.
Figure 6B:
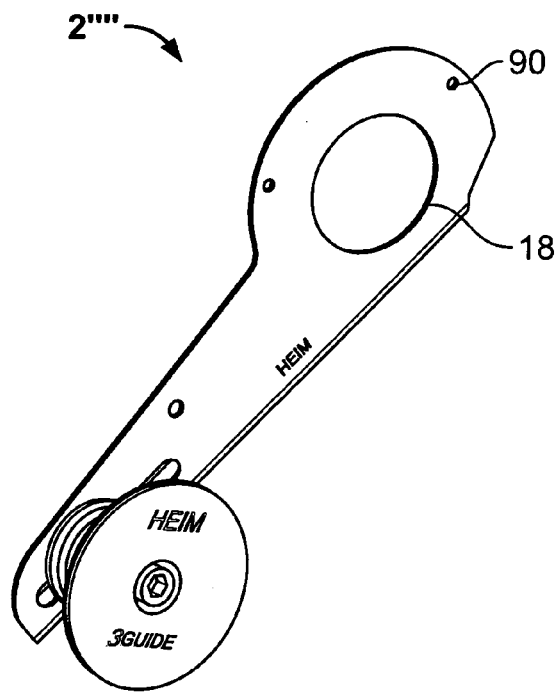

FIGS. 6A and 6B show another variation of the chain guide 2'''' in which additional roller features are provided to aid in chain retention. Here, a plurality of substantially consistent diameter circumferential grooves 80 are provided. As with the other taper and step features note above, the grooved features help keep the chain on—especially during backpedaling.

FIG. 6B illustrates yet another optional feature. Namely, additional dedicated mounting holes 90 are provided. If these are used to secure the mounting plate to the frame (e.g., by an opposing clamping member, not shown) or otherwise, hole 18 may be utilized merely for crank/bottom bracket spindle clearance.

Though the invention has been described in reference to certain examples optionally incorporating various features and depicted in reference to a single example, the invention is not to be limited as such. Numerous modifications and/or additions to or adaptations of the above-described embodiments may be apparent to one skilled in the art; it is intended that the scope of the present inventions extend to all such modifications and/or additions. The breadth of the present invention is to be limited only by the literal or equitable scope of the following claims.

I claim:

1. A bicycle chain guide device, comprising:
    a bracket for attachment to a bicycle frame, and
    a pulley rotably mounted to said bracket, said pulley comprising a roller section and a flange section spaced apart from said bracket by said roller section,
    wherein said roller section has an inner diameter adjacent said bracket, an outer diameter adjacent said flange and a width adapted to accommodate shifting a chain between at least two front sprockets for the bicycle frame by movement of said chain across said roller section, said bracket being configured to position said pulley in a substantially fixed position and allow for said shifting when attached to the bicycle frame, and
    wherein said flange section has a diameter adapted to prevent outward movement of said chain from an outer one of the at least two sprockets, and
    wherein said inner diameter is larger than said outer diameter in order to assist in maintaining said chain on a selected one of said at least two front sprockets.

2. The device of claim 1, further comprising bearings for said pulley.

3. The device of claim 1, wherein said roller section is tapered for at least a portion at an angle of up to about 7.5 degrees.

4. The device of claim 1, wherein the entirety of said roller section is tapered.

5. The device of claim 1, wherein said roller comprises a tapered section and a flat section.

6. The device of claim 5, wherein said flat section is inset from said tapered section.

7. The device of claim 1, wherein said pulley has two flanges on opposite ends of said pulley.

8. The device of claim 1, wherein said bracket is flat.

9. The device of claim 1, wherein said bracket comprises a rib for additional structural integrity.

10. The device of claim 1, wherein said flange has a diameter sized to overlap an outer one of said at least two front sprockets.

11. The device of claim 1, wherein said bracket comprises a slot provided for adjustably mounting said pulley.

12. A bicycle chain guide device, comprising:
a bracket for attachment to a bicycle frame, and
a pulley rotably mounted to said bracket, said pulley comprising a roller section and a flange section spaced apart from said bracket by said roller section,
a post mounted to said bracket at a location to prevent the chain from sticking to an inner sprocket,
wherein said roller section has a diameter and a width adapted to accommodate shifting a chain between at least two front sprockets for the bicycle frame by movement of said chain across said roller section, said bracket being configured to position said cost and said pulley in a substantially fixed position and allow for said shifting when attached to the bicycle frame, and
wherein said flange section has a diameter adapted to prevent outward movement of said chain from an outer one of the at least two sprockets.

13. The device of claim 12, wherein said post is fixedly mounted to said bracket.

14. The device of claim 12, wherein said post is rotably mounted to said bracket.

15. The device of claim 12, wherein said roller section comprises a plurality of grooves.

* * * * *